United States Patent [19]

Drori

[11] 4,436,686
[45] Mar. 13, 1984

[54] METHOD OF MANUFACTURING LEVEL VIALS

[76] Inventor: Michael Drori, Mobile Post - Upper Galil, Kibbutz Hagoshrim, Israel

[21] Appl. No.: 419,036

[22] Filed: Sep. 16, 1982

[30] Foreign Application Priority Data

Sep. 25, 1981 [IL] Israel .................................. 63934

[51] Int. Cl.³ .............................................. B29D 23/02
[52] U.S. Cl. ..................................... 264/163; 264/255; 264/328.8; 264/334
[58] Field of Search ............ 264/254, 255, 278, 328.2, 264/328.8, 163, 334; 249/91, 152, 177, 178

[56] References Cited

U.S. PATENT DOCUMENTS 3,311,690  3/1967  Fischer ................................ 264/278
3,320,344  5/1967  Slipp .................................... 264/278
4,130,264  12/1978  Schroer ............................... 249/178

Primary Examiner—James B. Lowe
Attorney, Agent, or Firm—Dennison, Meserole, Pollack & Scheiner

[57] ABSTRACT

A method for forming vials for levels wherein a barrel-shaped core is first molded from an opaque thermoplastic in a double-injection molding machine and has at least a pair of spaced annular ribs integral therewith. A transparent plastic vial is then molded about the core in the same machine. Thereafter, the core is removed, severing the ribs which remain in the vial body and serve as bubble indicia.

5 Claims, 1 Drawing Figure

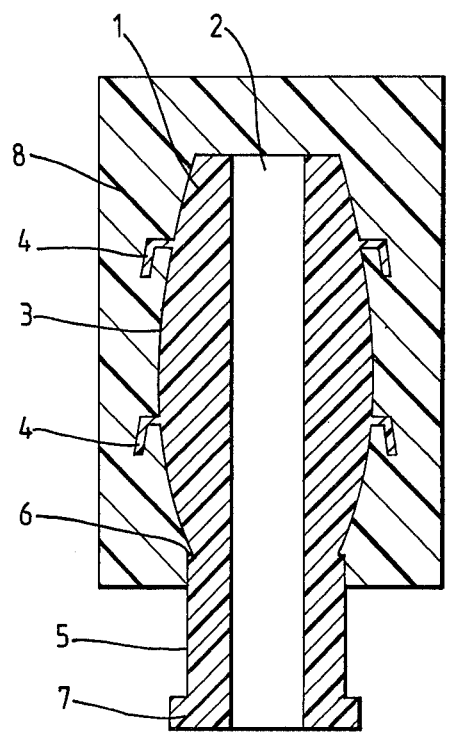

METHOD OF MANUFACTURING LEVEL VIALS

The present invention concerns a method of manufacturing level vials from thermoplastic materials.

One method of manufacturing such vials is by injecting a transparent thermoplastics materials into a mould in which a pin-like core is provided. After the vial body so moulded has cooled down it is removed from the injection mould, the pin is withdrawn and by means of a special turning tool, a barrel-like cavity is made within the body. Furthermore, some marking or graduations have to be provided, to give the position of the bubble when the level is in the right horizontal position. This marking is best done inside the level-bore, so as to prevent errors caused by parallax observation. One method of such marking is by turning two or more annular grooves, inside the barrel shape, and inserting into said grooves marker rings, with the aid of tweezers or other special tools. The annular grooves have a detrimental effect on the accuracy of the level, because they cause the resistance against the smooth movement of the bubble, when bringing the level into the correct position.

Since the sensitivity of a level depends on the accuracy of the shape of the bore, the turning of said bore requires careful execution. The surface finish must be very high. Thus, it can be seen that the manufacture of level vials is a complicated and expensive procedure requiring many manual and machine operations.

It is the object of the present invention to provide a method for making vials which is almost entirely performed in the injection moulding machine and thus requires little labor.

It is a further object of the invention to provide extremely sensitive vials by providing an accurate barrel-shaped cavity therein.

The invention consists in a method of manufacturing level vials comprising:

a. Moulding a core having the required barrel-like shape of an opaque thermosplastic material around a pin in a conventional double-injection moulding machine, b. Transferring said core into a suitable mould in the same machine and moulding the vial body around it of transparent thermoplastic, c. After cooling, removing said body and withdrawing said pin from the core and said core then from the body, the softening temperature of said transparent plastics being lower than that of the opaque plastics. Thereafter the markings are made on the outside of the body.

In one embodiment of the invention, said core is moulded with at least two spaced integral annular ribs, which, when said core is withdrawn from said body, are severed from the core and remain in the body, to constitute the markings. In a further preferred embodiment of the invention the said core is provided with a shoulder near the withdrawal end, whereby a stop for a plug adapted to close the vial is provided.

The invention is illustrated by way of example only in the accompanying drawings showing a longitudinal section of a level vial during its manufacture.

In a conventional injection moulding machine having two moulding stations a core 1 is moulded of an opaque thermoplastic material. This core comprises an internal axial through-going bore 2 which is effected by moulding it around a pin or the like (not shown). The main part of said core has a barrel-like external profile 3 and two integral annular ribs 4 which are preferably but not necessarily of hook-like section as shown, said ribs being destined to constitute the conventional marker rings. The outer end of core 1 is cylindrical at 5 and has a shoulder 6 adjacent part 3. An integral flange 7 is provided at the outer-most end of the core. After the core has been moulded it is transferred to the second injection station in the injection moulding machine, and here the body 8 of the vial is moulded of transparent thermoplastic material around the core, the transparent material having a lower softening temperature than that of the core.

After cooling, the said pin is removed from the core whereby the core can collapse so that it can be withdrawn by pulling it outwards from body 8. The marker rings 4 will thereby be severed from the core body and will remain in the body 8 having been anchored therein during the moulding of the latter.

The vial is now completed by inserting vial fluid therein and plugging the opening, the shoulder 6 providing a stop for the plug.

The vial body 8 may be of circular, polygonal, square, or any other desired cross-section. Furthermore, if more than two markers are required, core 1 will be moulded with more than two integral marker rings 4.

It can be seen that this method of manufacturing a vial is quick, accurate, efficient and requires a minimum of handling. In fact, only the withdrawal of the core, the filling of the cavity and plugging it requires manual operation.

Although the provision of shoulder 6 on the core makes for a stop for the plug when the vial body is cast, said stop may also be eliminated and a plug having a flange may be provided.

If desired, the markings for the bubble can be made by a suitable method other than providing the core with integral ribs, e.g. markings moulded integrally with the vial body, painting or printing externally or internally or marking the body in any other suitable way.

I claim:

1. A method of manufacturing level vials comprising the steps of:

a. molding a core of an opaque thermoplastic material around a pin member in a conventional double-injection molding machine, the resulting core having a barrel-like shape and at least two spaced external integral thin annular ribs, b. transferring said core into a second suitable mold in the same machine and molding a vial body around it of transparent thermoplastic material, c. removing said vial body from said machine after cooling and withdrawing said pin member from the core and then said core from the vial body, whereby said ribs are severed from the core and remain in said body, to form bubble indicia, the softening temperature of said transparent plastic being lower than that of the opaque plastic.

2. A method as claimed in claim 1, wherein said core has an integral shoulder near one end.

3. A method as claimed in claim 1, wherein said core is provided with a cylindrical extension having a flange at its end.

4. A method as claimed in claim 1, wherein the cross-section of said body is circular.

5. A method as claimed in claim 1, wherein the cross-section of said body is polygonal.

* * * * *